Jan. 15, 1929.  1,699,325
C. W. DAKE
BALL BEARING
Filed Dec. 6, 1926   2 Sheets-Sheet 1
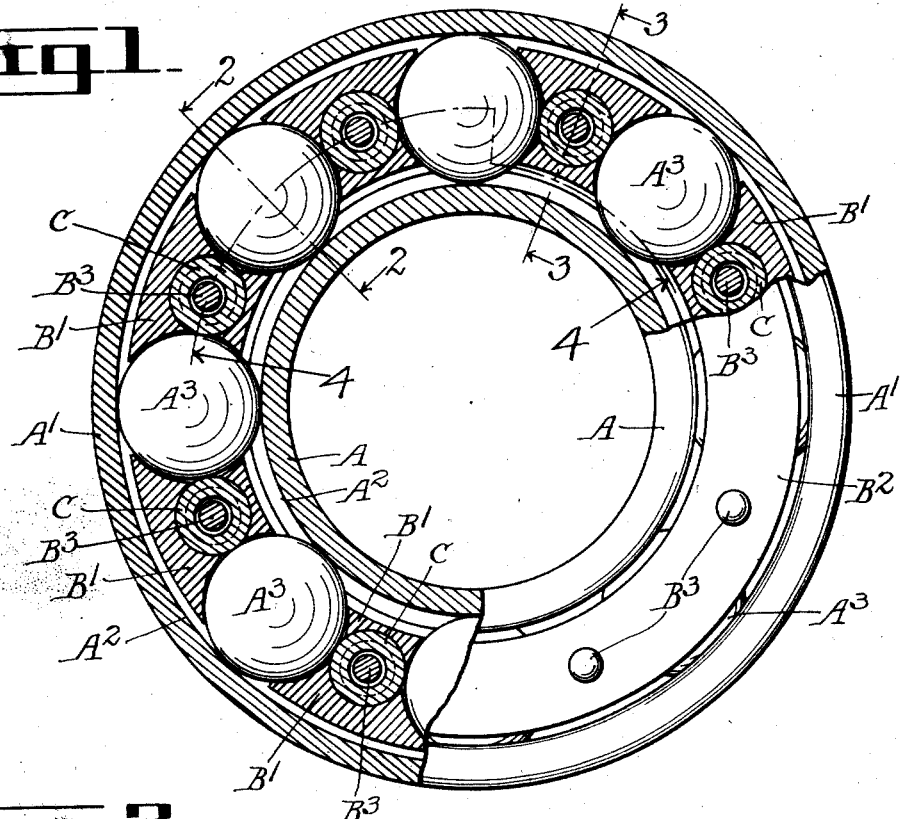
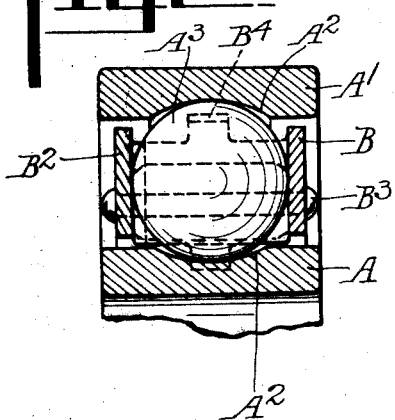
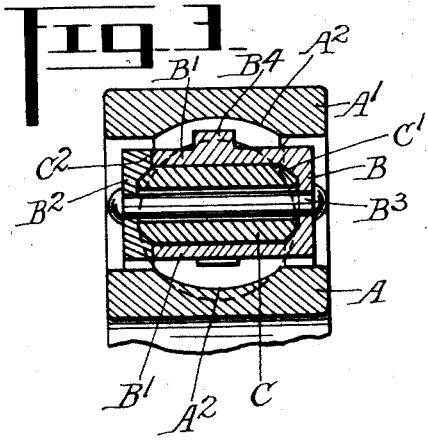
INVENTOR
Charles W. Dake
BY
ATTORNEY

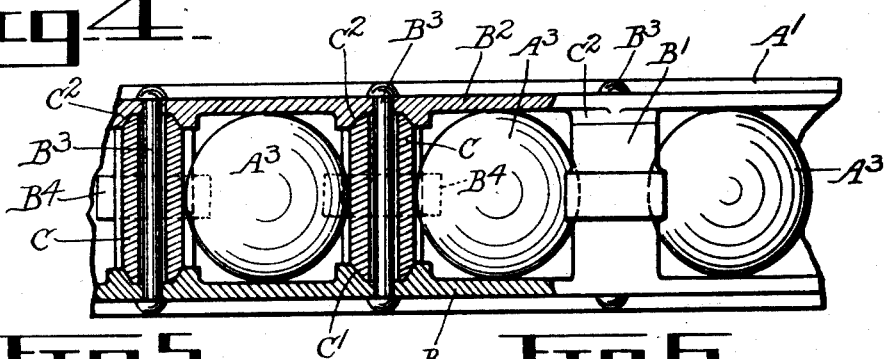

Patented Jan. 15, 1929.

1,699,325

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

BALL BEARING.

Application filed December 6, 1926. Serial No. 152,741.

My invention relates to improvements in ball bearings and has for one object to provide a new and improved type of ball bearing wherein the ball spacing elements may be easily and conveniently assembled with the balls and wherein the creeping or traveling of the balls with respect to each other is not able to exert any lateral disrupting effect on the retainer rings and wherein anti-friction means are interposed between adjacent balls to prevent binding and clamping of the balls in their traveling action. Other objects will appear from time to time throughout the specification and claims.

My invention is illustrated more or less diagrammatically in the accompanying drawings, wherein—

Figure 1 is a side elevation in part section;
Figure 2 is a section along the line 2—2 of Figure 1;
Figure 3 is a section along the line 3—3 of Figure 1;
Figure 4 is a section along the line 4—4 of Figure 1;
Figure 5 is a side elevation of the ball cage;
Figure 6 is an edge elevation of the ball cage;
Figure 7 is a plan view of the removable cage ring.

Like parts are indicated by like characters throughout the specification and drawings.

A is the inner race, A¹ the outer race. These races are channelled as at A² in the usual manner. A³ A³ are a series of balls adapted for travel between the two races.

The ball cage shown in general in Figures 5 and 6 comprise the fixed ring B, a plurality of filler blocks B¹ projecting laterally therefrom, there being space between each pair of filler blocks for a ball and a cover ring B² adapted to close such space in opposition to the fixed ring B. Rivets B³ pass through the filler blocks B¹ and the cover ring B² to hold them together when the apparatus is assembled. It will be noted that the filler blocks each having a reinforced belt B⁴ project outwardly from the periphery thereof.

Each of the filler blocks B¹ is socketed and in each socket is an anti-friction roller C. The socket terminates in a conical end C¹ in the ring B adapted to be engaged by the conical end of the roller C. The cover ring B² has a series of bosses C² thereon which bosses are socketed like the sockets in the fixed ring B to engage the opposed end of the rollers. The rivets B³ pass through the hollow interior of these rollers and are out of contact therewith so that the only bearing between the rollers and cage or ring is at the opposed ends of the roller in the conical sockets. These rollers are spaced between the balls and project beyond the filler blocks so that each ball is in engagement with the rollers and not in engagement with the fixed filler block thereby permitting rotary movement of the rollers in engagement with the balls and furnishing an anti-friction bearing or contact for the balls.

I claim:

1. A spacing cage for anti-friction bearings and the like comprising a pair of parallel annular rings, bearing blocks spaced therealong and joining said rings, rotatable anti-friction bearing members mounted for rotation in said blocks and projecting beyond the surface thereof, said members comprising rotatable hollow cylinders and means passing through but out of contact with the cylinders for holding the rings together.

2. In a bearing comprising inner and outer races and anti-friction rotatable load carrying members free to travel between them, a cage having spacer blocks between each pair of members and anti-friction spacing members carried by the spacer blocks out of contact with the race and in engagement with the load carrying members, the anti-friction spacing members comprising rotatably mounted rollers.

3. In a ball bearing, inner and outer races, balls free to travel therebetween, spacer blocks interposed between adjacent balls, rings on each side of the group of blocks and balls adapted to hold the blocks in place between the balls, roller bearings in each block interposed between and adapted to be engaged by the balls.

4. In a ball bearing, inner and outer races, balls free to travel therebetween, spacer blocks interposed between adjacent balls, rings on each side of the group of balls and blocks adapted to hold the blocks in place between the balls, roller bearings in each block interposed between and adapted to be engaged by the balls, said roller bearings comprising cylinders tapered at their ends, there being sockets in the opposed rings to engage said tapered cylinder ends.

5. In a ball bearing, inner and outer races, balls free to travel therebetween, spacer blocks interposed between adjacent balls, rings on each side of the group of balls and blocks adapted to hold the blocks in place between the balls, roller bearings in each block interposed between and adapted to be engaged by the balls, said roller bearings comprising cylinders tapered at their ends, there being sockets in the opposed rings to engage said tapered cylinder ends, the cylinders being hollow tie-rods extending through but out of contact with the cylinders and adapted to hold the rings together.

Signed at Chicago, county of Cook and State of Illinois, this 3rd day of December 1926.

CHARLES W. DAKE.